United States Patent
Carey et al.

(10) Patent No.: US 9,328,287 B2
(45) Date of Patent: May 3, 2016

(54) PASSIVATION OF METAL HALIDE SCINTILLATORS

(71) Applicant: Siemens Medical Solutions USA, Inc., Malvern, PA (US)

(72) Inventors: A. Andrew Carey, Lenoir City, TN (US); Peter Carl Cohen, Knoxville, TN (US); Mark S. Andreaco, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 173 days.

(21) Appl. No.: 14/153,290

(22) Filed: Jan. 13, 2014

(65) Prior Publication Data

US 2014/0203210 A1   Jul. 24, 2014

Related U.S. Application Data

(60) Provisional application No. 61/754,737, filed on Jan. 21, 2013.

(51) Int. Cl.
*C09K 11/77* (2006.01)

(52) U.S. Cl.
CPC ......... *C09K 11/7772* (2013.01); *C09K 11/7704* (2013.01); *C09K 11/7719* (2013.01); *C09K 11/7733* (2013.01)

(58) Field of Classification Search
CPC .................. C09K 11/7719; C09K 11/7733
See application file for complete search history.

(56) References Cited

U.S. PATENT DOCUMENTS 7,435,975 B2 * 10/2008 Shoji ................. G01T 1/202
                                                    250/367

* cited by examiner

*Primary Examiner* — Carol M Koslow
(74) *Attorney, Agent, or Firm* — Peter Kendall

(57) ABSTRACT

A halide material, such as scintillator crystals of $LaBr_3$:Ce and $SrI_2$:Eu, with a passivation surface layer is disclosed. The surface layer comprises one or more halides of lower water solubility than the scintillator crystal that the surface layer covers. A method for making such a material is also disclosed. In certain aspects of the disclosure, a passivation layer is formed on a surface of a halide material such as a scintillator crystal of $LaBr_3$:Ce of $SrI_2$:Eu by fluorinating the surface with a fluorinating agent, such as $F_2$ for $LaBr_3$:Ce and HF for $SrI_2$:Eu.

7 Claims, No Drawings

PASSIVATION OF METAL HALIDE SCINTILLATORS

CROSS-REFERENCE TO RELATED APPLICATIONS

This application claims the benefit of U.S. Provisional Application Ser. No. 61/754,737, filed Jan. 21, 2013, which provisional application is incorporated herein by reference.

TECHNICAL FIELD

This disclosure relates to scintillator materials and particularly to metal halide scintillator materials. Certain arrangements also relate to specific compositions of such scintillator material and method of making the same.

BACKGROUND

Scintillator materials, which emit light pulses in response to impinging radiation, find a wide range of applications, including medical imaging, particle physics and geological exploration. While a variety of scintillator materials have been made, there is a continuous need for superior scintillator materials.

SUMMARY

The present disclosure relates to halide scintillator materials that include a bulk metal halide scintillator material with one or more passivation surface layers that have a lower hygroscopicity, or solubility in water, than the bulk material, thereby protecting the bulk scintillator material from moisture.

In one example, a starting metal halide scintillator material, such as a $LaBr_3$:Ce crystal, is treated with a material, such as $F_2$ or $BF_3$ gas, that reacts with the starting material to form a surface layer of a compound, such as $LaF_3$, that is less hygroscopic than the starting material.

In another example, a material comprises a metal halide crystal, which can be a scintillator crystal, such as a $LaBr_3$:Ce crystal, with a coating of a less hygroscopic material, such as $LaF_3$.

DESCRIPTION

Metal halides constitute a large class of scintillators. NaI:Tl is one of the first single crystal scintillators discovered and is still widely used. Another popular example is $SrI_2$:Eu. With exception with group 1 metal halides, in general, the solubility of the metal halide increases in transitioning down the series (F>Cl>Br>I). Any element above in the series can displace one below it. For example, chlorine (or HCl) can displace iodide anion and F can displace Cl. Thus, a metal halide fluorinated surface should in general be less hygroscopic, or water soluble, than the other possible halides.

Cerium doped lanthanum bromide, LaBr3:Ce, for example, is an excellent scintillator, with a high light output, narrow energy resolution, short decay time and excellent timing resolution. However, $LaBr_3$:Ce has a serious drawback: its hygroscopic behavior, i.e. high solubility in water. According to one aspect of the present disclosure, a layer of material like $LaF_3$ can be formed on the LaBr3:Ce. $LaF_3$ makes a good coating because it has a solubility of only about 2 ppm.

In another aspect of the present disclosure, fluorine gas ($F_2$) or multiple other strong fluorinating agents can be used to fluorinate the surface of metal halide crystals such as $LaBr_3$. Fluorine in the fluorine gas simply displaces bromine on the surface according to the reaction:

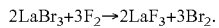
$2LaBr_3 + 3F_2 \rightarrow 2LaF_3 + 3Br_2$.

The gas phase reaction of $F_2$ simply displaces the bromide ions at or near the surface and is thermodynamically preferred. Light and heat can control the amount of fluorination. Fluorination for passivating materials has been used in industry, particularly in semiconductor industry. The fluorination process is thus well known to those skilled in the art.

In another aspect of the preset disclosure, successive coating layers of lanthanum fluoride/bromide occur:

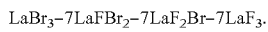
$LaBr_3 - 7LaFBr_2 - 7LaF_2Br - 7LaF_3$.

Thus, the surface of the crystal is passivated and can simplify the manufacture of such crystals.

In another aspect of the disclosure, a fluorinating agent is boron trifluoride $BF_3$. This volatile gas is a classic Lewis acid, and as such is a source of labile fluorine. The reaction can be expressed as:

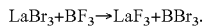
$LaBr_3 + BF_3 \rightarrow LaF_3 + BBr_3$.

Boron tribromide ($BBr_3$) is volatile and can be removed in a vacuum. $BF_3$ would also make a good catalyst for fluorination using $F_2$.

In a further aspect of the disclosure, anhydrous HF can also be used to provide fluorine, which displaces a lower halogen. For example, HF can be used with $SrI_2$:Eu.

Other fluorinating agents include, but not limited to: $PF_5$, $SbF_5$, $SF_4$, $NF_3$, $SiF_4$, $WF_6$, $ClF_3$, $BrF_5$ (and other interhalogen gases) and xenon fluorides.

The fluorination procedure can also be used on other metal halides, such as NaI.

Thus, metal halide scintillators and scintillation detectors with improved stability against moisture can be made by forming one or more surface layers of halides of lower solubility than the interior region of the metal halide. Because many embodiments of the invention can be made without departing from the spirit and scope of the invention, the invention resides in the claims hereinafter appended.

We claim:

1. A material, comprising:
   a crystal of a first metal halide; where the first metal halide is a scintillator material; wherein the first metal halide comprises $LaBr_3$:Ce; and
   a surface layer on the first metal halide crystal comprising a second metal halide having a lower water solubility than the first metal halide; wherein the second metal halide comprises one or more of $LaFBr_2$, $LaF_2Br$ and $LaF_3$.

2. The material of claim 1, wherein the surface layer is formed by fluorinating a surface of the crystal of the first metal halide with a fluorinating agent.

3. The material of claim 2, wherein the fluorinating agent comprises one of more of $F_2$, $BF_3$, HF, $PF_5$, $SbF_5$, $SF_4$, $NF_3$, $SiF_4$, $WF_6$, interhalogen fluoride gases and xenon fluorides.

4. A method of making a material, comprising forming, on a surface of a crystal of a first metal halide, a layer of a second metal halide having a lower water solubility than the first metal halide; where the first metal halide is a scintillator material; wherein the first metal halide comprises $LaBr_3$:Ce; and wherein the second metal halide comprises one or more of $LaFBr_2$, $LaF_2Br$ and $LaF_3$.

5. The method of claim 4, wherein forming the layer comprises fluorinating the surface of the crystal of the first metal halide with one or more of $F_2$, $BF_3$, HF, $PF_5$, $SbF_5$, $SF_4$, $NF_3$, $SiF_4$, $WF_6$, interhalogen fluoride gases and xenon fluorides.

6. A material, comprising:
a crystal of a first metal halide; where the first metal halide is a scintillator material that comprises $SrI_2$:Eu; and wherein a surface layer is formed by fluorinating a surface of the scintillator material that comprises $SrI_2$:Eu with HF.

7. A method of making a material, comprising forming, on a surface of a crystal of a first metal halide, a layer of a second metal halide having a lower water solubility than the first metal halide; where the first metal halide is a scintillator material that comprises $SrI_2$:Eu; and where the second metal halide is obtained by fluorinating a surface of the scintillator material that comprises $SrI_2$:Eu with HF.

* * * * *